Patented Jan. 20, 1953

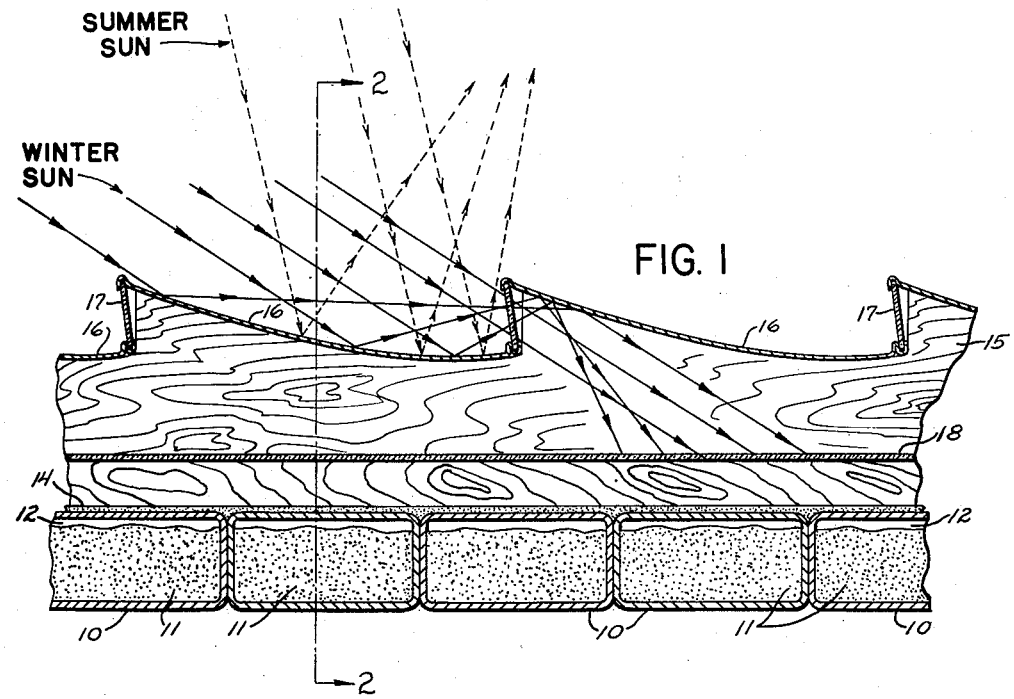
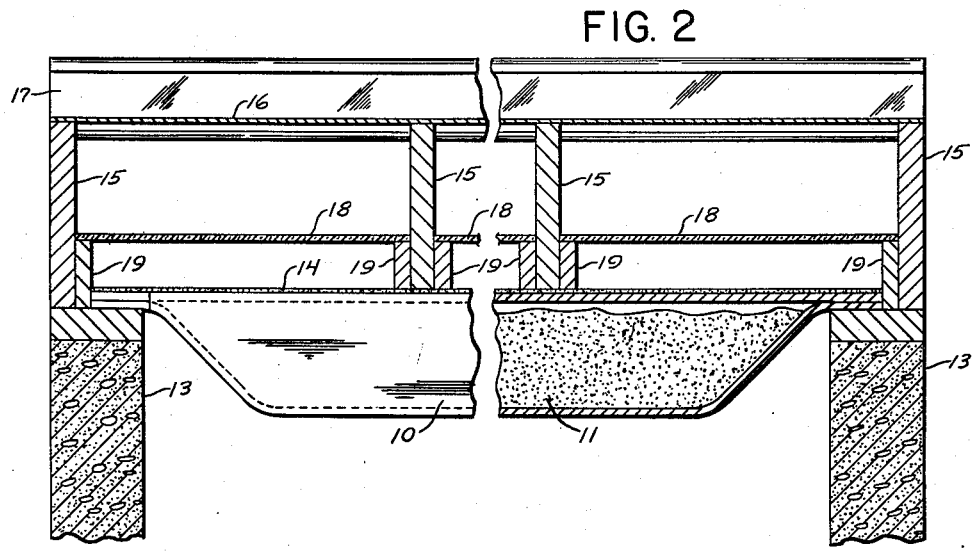

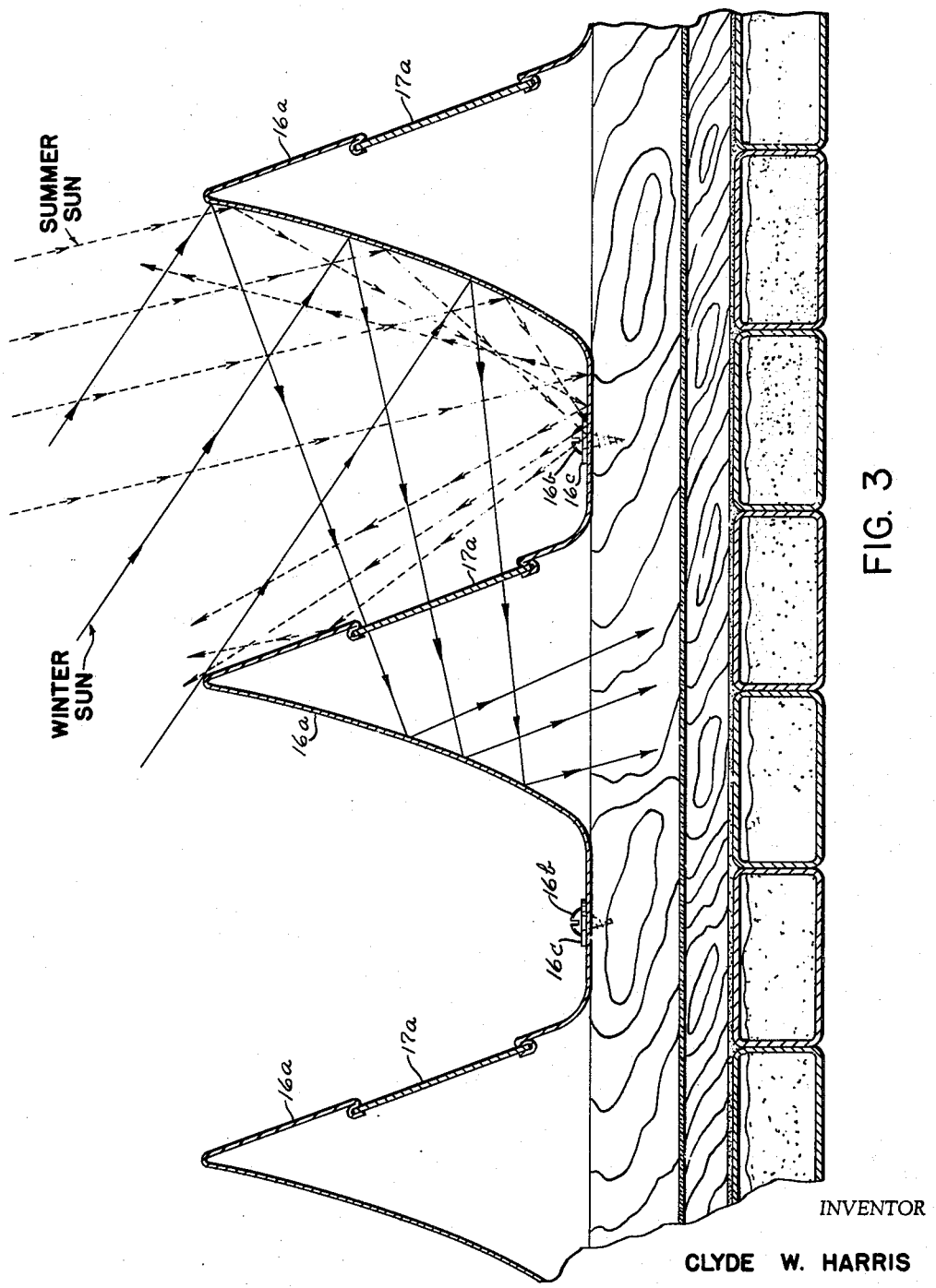

2,625,930

UNITED STATES PATENT OFFICE 2,625,930

SOLAR-HEATING STRUCTURE

Clyde W. Harris, Socorro, N. Mex.

Application June 2, 1950, Serial No. 165,657

3 Claims. (Cl. 126—270)

This invention relates to building structures adapted for solar heating of the interior of the building.

Some features disclosed in this application are more broadly claimed in my copending applications Serial No. 785,316, filed Nov. 12, 1947, Serial No. 48,671, filed Sept. 10, 1948, and Serial No. 86,234, filed April 8, 1949.

The chief objects of the present invention are to provide a simple, inexpensive, durable and highly effective structure for the above stated purpose.

More specific objects are to provide a compact and efficient structure, localized in a single space-enclosing element of the building, such as a wall or the ceiling-and-roof structure, for performing the three functions of (1) collecting solar energy, (2) storing the energy for use at night or on cloudy days and (3) transmitting the stored heat to the interior of the room when it is needed.

A further specific object is to provide economically and effectively for conservation of heat by providing heat-storage means effectively insulated against escape of heat therefrom except to the interior of the room.

Of the accompanying drawings:

Fig. 1 is a north-and-south section of a ceiling-and-roof structure embodying my invention in one of its preferred forms.

Fig. 2 is a section on line 2—2 of Fig. 1, with the middle part of the structure broken away.

Fig. 3 is a north-and-south section of a modification.

The embodiment shown in Figs. 1 and 2 comprises a set of laterally abutted hollow metal ceiling beams 10, 10 each containing a substance 11 having a temperature of reversible transition a little higher than the desired room temperature, a good example of which is tertiary butyl alcohol (trimethyl carbinol), which melts at 77.7 degrees F. and stores 21 B. t. u. per lb. of the material in melting and releases a corresponding amount of heat in freezing.

The beams are filled not quite full of the material, so that an air space 12 above the material in each beam is left to provide for expansion and contraction of the material.

The beams are closed at their ends, as shown clearly in Fig. 2, and the ends of each beam are mounted upon respective wall structures 13, 13.

Upon the set of beams is a layer of opaque and preferably black material 14 which can be merely a coat of paint, for converting the rays of the sun into heat, and preferably the layer is thin, for good transmission of the heat, through the metal of the beam, to the heat-storing material 11.

Mounted upon the hollow ceiling beams, crosswise thereof, are a set of roof joists 15, 15 of which the upper edges are suitably shaped, sawtooth fashion, to seat with extensive contact a set of approximately horizontal sheet-metal reflectors 16, 16 having both upper and lower reflecting faces.

Each reflector has a margin approximately under the adjacent margin of the next and the said margins, of each pair, are crimped to hold in place a glass or other transparent sheet 17, approximately in a vertical position.

Thus the reflectors and the glass provide an outer wall-element of serrated or stepped form exposed to solar radiation and adapted to transmit the said radiation to the surface of the layer of opaque material 14.

Each reflector, with a concave upper face, has such curvature and is set in such relation to the transparent sheet 17 rising from its margin as to reflect rays of the winter sun, with concentration of the reflected rays, through the transparent sheet and onto the convex lower face of the adjacent reflector, which, with divergence of the reflected rays, reflects the rays onto the conversion or energy-absorbing opaque surface material 14, from which the heat is transmitted by conduction, and to some extent by radiation, to the metal of the beams 10 and thence to the heat-storing material 11.

The reflectors serve as gutters for shedding of rain water and can be given a lengthwise slope for improving their performance of that function.

To lessen escape of heat back into the outer atmosphere, two superimposed sets of insulating air-pockets are provided by dividing each space between joists 15 into an upper pocket and a lower pocket by sheets of glass or other transparent material 18, 18 supported upon ledges provided by spacer strips 19, 19 set against and secured to the side faces of the joists 15.

With proportions as here shown, which are of course subject to variation, and under climatic conditions existing at Socorro, N. Mex., for example, and with suitable control of ventilation, the room temperature will remain within a comfortable range throughout a much greater range of outdoor temperature, the heat-storing material absorbing a large amount of heat in melting and, in refreezing, transmitting a large amount of heat to the interior of the room.

My present invention is well adapted for the use in conjunction therewith of any known or suitable variable-insulation means, such, for example, as that described and claimed in my copending application Serial No. 48,671, filed Sept. 10, 1948.

The modification shown in Fig. 3 corresponds to that shown in Figs. 1 and 2 except that the reflectors, 16a, 16a are of somewhat different shape, are more nearly vertical, and, with greater angles of incidence and reflection, reflect the rays in a southerly direction, instead of a northerly direction, for their passage through the transparent sheets, 17a, 17a, and onto the inner face of the adjacent reflector.

In this embodiment of Fig. 3 it is unnecessary to give the roof joists a saw-tooth edge contour, as the sheet metal members 16a, 16a have such shape that they are self-supporting and strongly resist distortion when secured to straight upper edges of the joists, as shown, by screws 16b, 16b having rubber sealing washers 16c, 16c under their heads.

Further modifications are possible without departure from the scope of the invention as defined by the appended claims, in which the word "wall" is intended to be inclusive of a ceiling-and-roof structure as well as a side wall of a building.

An advantage of the structure as described is that throughout a large part of the summer months, when the sun is higher in the sky, its rays hit the reflectors at such angles that they are reflected back into the sky, instead of through the glass windows, as indicated by the broken lines, so that shades, blinds or the like are unnecessary.

In the appended claims the word house-wall is intended to be inclusive of both roof walls and side walls.

I claim:

1. A solar-heating house-wall structure comprising a series of hollow, strength-giving wall members, a heat-storage material in said members and having a temperature of reversible transition moderately higher than 68 degrees F., and, spaced from said members and therewith defining a heat-insulating air space, an outer wall-element of stepped form and comprising a series of light-transmitting elements and in alternation therewith, a series of reflector elements, each of the latter having an outer reflecting surface formed and positioned for reflecting solar radiation through one of the said light-transmitting elements and an inner reflecting surface formed and positioned to receive solar radiation from one of said light-transmitting elements and reflect it onto the said hollow wall members.

2. A solar-heating house-wall structure comprising an opaque house-wall element for transforming solar radiation into heat, and, spaced from said element and therewith defining a heat-insulating air space, an outer wall-element of stepped form and comprising a series of light-transmitting elements and, in alternation therewith, a series of reflector elements, each of the latter having an outer reflecting surface formed and positioned for reflecting solar radiation through one of the said light-transmitting elements and an inner reflecting surface formed and positioned to receive solar radiation from one of said light-transmitting elements and reflect it onto said opaque house-wall element.

3. A structure as defined in claim 2 in which the recited outer reflecting surface of each of the recited reflector elements is of such shape and has such angular relation to the earth and to an adjacent one of the recited light-transmitting elements that it reflects solar radiation through the said light-transmitting element only as to the winter sun and not as to the summer sun.

CLYDE W. HARRIS.

REFERENCES CITED

The following references are of record in the file of this patent:

UNITED STATES PATENTS

| Number | Name | Date |
|---|---|---|
| 117,476 | Sperry | July 25, 1871 |
| 246,626 | Morse | Sept. 6, 1881 |
| 290,851 | Calver | Dec. 25, 1883 |
| 430,762 | Taylor | June 24, 1890 |
| 679,451 | Baker | July 30, 1901 |
| 681,095 | Baker | Aug. 20, 1901 |
| 965,391 | Little | July 26, 1910 |
| 2,428,876 | Hawkins | Oct. 14, 1947 |
| 2,469,496 | Christenson | May 10, 1949 |